(12) United States Patent
Yamamoto

(10) Patent No.: US 7,167,596 B2
(45) Date of Patent: Jan. 23, 2007

(54) IMAGE PROCESSING METHOD FOR GENERATING THREE-DIMENSIONAL IMAGES ON A TWO-DIMENSIONAL SCREEN

(75) Inventor: Hiroshi Yamamoto, Tokyo (JP)

(73) Assignee: Sony Computer Entertainment Inc. (JP)

( * ) Notice: Subject to any disclaimer, the term of this patent is extended or adjusted under 35 U.S.C. 154(b) by 807 days.

(21) Appl. No.: 10/058,840

(22) Filed: Jan. 28, 2002

(65) Prior Publication Data

US 2002/0110274 A1    Aug. 15, 2002

(30) Foreign Application Priority Data

Jan. 26, 2001 (JP) ............................ 2001-018379
Oct. 30, 2001 (JP) ............................ 2001-331749

(51) Int. Cl.
    G06K 9/40    (2006.01)
(52) U.S. Cl. .............. 382/269; 345/592; 345/611; 345/629
(58) Field of Classification Search ............... 382/266, 382/269; 345/592, 611–616, 629
    See application file for complete search history.

(56) References Cited

U.S. PATENT DOCUMENTS

| | | | |
|---|---|---|---|
| 5,250,928 A * | 10/1993 | Kuriki ........................ 345/593 |
| 5,473,737 A * | 12/1995 | Harper ........................ 345/592 |
| 5,754,186 A * | 5/1998 | Tam et al. .................. 345/629 |
| 5,818,454 A * | 10/1998 | Arai et al. .................. 345/593 |
| 5,912,672 A * | 6/1999 | Liguori ....................... 345/619 |
| 5,914,725 A * | 6/1999 | MacInnis et al. ........... 345/441 |
| 6,057,866 A * | 5/2000 | Haneda et al. ............. 347/118 |
| 6,208,350 B1 * | 3/2001 | Herrera ...................... 345/582 |
| 6,377,279 B1 * | 4/2002 | Miura ......................... 345/635 |
| 6,409,598 B1 * | 6/2002 | Takeuchi .................... 463/31 |
| 6,456,294 B1 * | 9/2002 | Vos ............................. 345/601 |
| 6,466,224 B1 * | 10/2002 | Nagata et al. ............. 345/592 |
| 6,803,968 B1 * | 10/2004 | Numata ...................... 348/584 |
| 2002/0027617 A1 * | 3/2002 | Jeffers et al. ............... 348/587 |

FOREIGN PATENT DOCUMENTS

JP        11306366 A        11/1999
JP        2002-092628 A1    3/2002

* cited by examiner

*Primary Examiner*—Amelia M. Au
*Assistant Examiner*—Charles Kim
(74) *Attorney, Agent, or Firm*—Lerner, David, Littenberg, Krumholz & Mentlik, LLP

(57) ABSTRACT

The image processing device is designed to retrieve a predetermined data section from data composing a first image, to retrieve a coefficient value from a predetermined table using a value of the retrieved data section as an index, and to subject the first image to image processing using the coefficient value. This allows alteration of the degree of anti-aliasing depending on the luminance of an image (e.g., luminance of an edge portion), extensive reduction in jaggedness at the edge portions having a high luminance which tends to make flicker visually prominent, and reduction in the cost and size of the device.

29 Claims, 13 Drawing Sheets

FIG. 2
(Prior Art)

| NO. | R | G | B | A |
|-----|-----|-----|-----|-----|
| 00 | ff | 00 | 00 | 80 |
| 01 | ff | ff | ff | 80 |
| 02 | 40 | 80 | 40 | 80 |
| 03 | 00 | 00 | ff | 80 |
| 04 | 00 | 00 | 00 | 80 |
| . | . | . | . | 80 |
| . | . | . | . | . |
| . | . | . | . | . |
| 7e | . | . | . | 80 |
| 7f | . | . | . | 80 |
| 80 | . | . | . | 80 |
| 81 | . | . | . | 80 |
| 82 | . | . | . | 80 |
| . | . | . | . | . |
| . | . | . | . | . |
| . | . | . | . | . |
| fe | . | . | . | 80 |
| ff | . | . | . | 80 |

FIG. 5

| NO. | R | G | B | A |
|-----|-----|-----|-----|-----|
| 00 | ff | 00 | 00 | ff |
| 01 | ff | ff | ff | fe |
| 02 | 40 | 80 | 40 | fd |
| 03 | 00 | 00 | ff | fc |
| 04 | 00 | 00 | 00 | fb |
| . | . | . | . | . |
| . | . | . | . | . |
| . | . | . | . | . |
| 7e | . | . | . | 81 |
| 7f | . | . | . | 80 |
| 80 | . | . | . | 7f |
| 81 | . | . | . | 7e |
| 82 | . | . | . | 7d |
| . | . | . | . | . |
| . | . | . | . | . |
| . | . | . | . | . |
| fe | . | . | . | 01 |
| ff | . | . | . | 00 |

IMAGE PROCESSING METHOD FOR GENERATING THREE-DIMENSIONAL IMAGES ON A TWO-DIMENSIONAL SCREEN

CROSS REFERENCE TO RELATED APPLICATIONS

The present application claims priority from Japanese Patent Application No. 2001-18379 filed on Jan. 26, 2001 and No. 2001-331749 filed on Oct. 30, 2001, the disclosures of which are hereby incorporated by reference herein.

BACKGROUND OF THE INVENTION

The present invention relates to an image processing method and a device used therefor for generating three-dimensional images to be drawn on a two-dimensional screen, such as on a television monitor, a computer-readable recording medium having recorded thereon an image processing program, a program execution device and an image processing program.

There are accelerating trends in higher integration and faster processing speeds of processors and memories in recent television game machines and personal computers which enable real-time generation of three-dimensional images with real presence and perspective in the display thereof on two-dimensional monitor screens.

When a three-dimensional image is drawn on a two-dimensional monitor screen, the three-dimensional polygon data are subjected to various geometric processing, such as coordinate conversion, clipping and lighting, and the resultant data are further subjected to transparent projection conversion.

In the drawing of a three-dimensional image, the positions of the polygons, which have been given by floating-point representation or fixed-point representation, are converted into integers so as to correspond to pixels at fixed positions on a two-dimensional screen, so that so-called aliasing occurs, which undesirably emphasizes the step-like unsmoothness (so-called jaggedness) of the pixel profile on the edge of the image.

A conventional solution for generating a jagged-free image is to perform so-called anti-aliasing, which is a process for removing or preventing aliasing.

More specifically, the conventional image processing reduces jaggedness by a method of, for example, drawing half-tone data generated by interpolating pixel data, or by virtually dividing one pixel into finer units called sub-pixels, performing calculations such as ray tracing on a sub-pixel basis, and then averaging the calculated results on a pixel basis. In another conventional method of image processing, jaggedness is reduced by anti-aliasing in which a high-resolution image is generated and then filtered to thereby reduce the number of pixels.

Jaggedness due to aliasing tends to be most distinctive at a portion having a particularly high luminance of the image edge. For a case in which the three-dimensional image is a moving image, jaggedness generated at such edge portion having a high luminance will intensify flicker in a displayed image to thereby make such image quite unrecognizable.

However, as the conventional technique reduces jaggedness by processing not only the image edge but also the overall image, an expensive processor device capable of rapid operational processing and a large-capacity, high-speed storage element are required, which inevitably results in a higher price and larger size of the image processing device.

SUMMARY OF THE INVENTION

The present invention was proposed to address the foregoing problems, and an object thereof resides in providing an image processing method and a device used therefor, a computer-readable recording medium having recorded therein an image processing program., a program execution device and an image processing program, all of which are aimed at successfully altering the degree of anti-aliasing depending on the luminance of an image (e.g., luminance of an edge portion), extensively reducing the jaggedness at the edge portions having a high luminance which tends to make flicker visually prominent, and reducing the cost and size of such device.

The present invention is designed to retrieve a predetermined data section from data composing a first image, to retrieve a coefficient value from a predetermined table using a value of the data section as an index, and to subject the first image to image processing using the coefficient value.

More specifically in the present invention, a predetermined table having a plurality of semi-transparent coefficients which are gradated is preliminarily prepared; a data section expressing an edge of the image, which largely affects the luminance, is extracted from the predetermined data section; a semi-transparent coefficient is retrieved from the predetermined table using as the index a value of the extracted data section; and the first image and a second image obtained by blurring the first image using the semi-transparent coefficient are synthesized. This allows alteration of the degree of anti-aliasing depending on the luminance of the edge portion of the image, and thus allows extensive reduction in jaggedness at the edge portion having a high luminance.

BRIEF DESCRIPTION OF THE DRAWINGS

FIG. 2 is a chart for explaining a general CLUT;

FIG. 5 is a chart for explaining a CLUT according to the present embodiment in which α values are gradated;

DETAILED DESCRIPTION

Constitution of an Image Processing Device of the Present Embodiment

Figure 1:
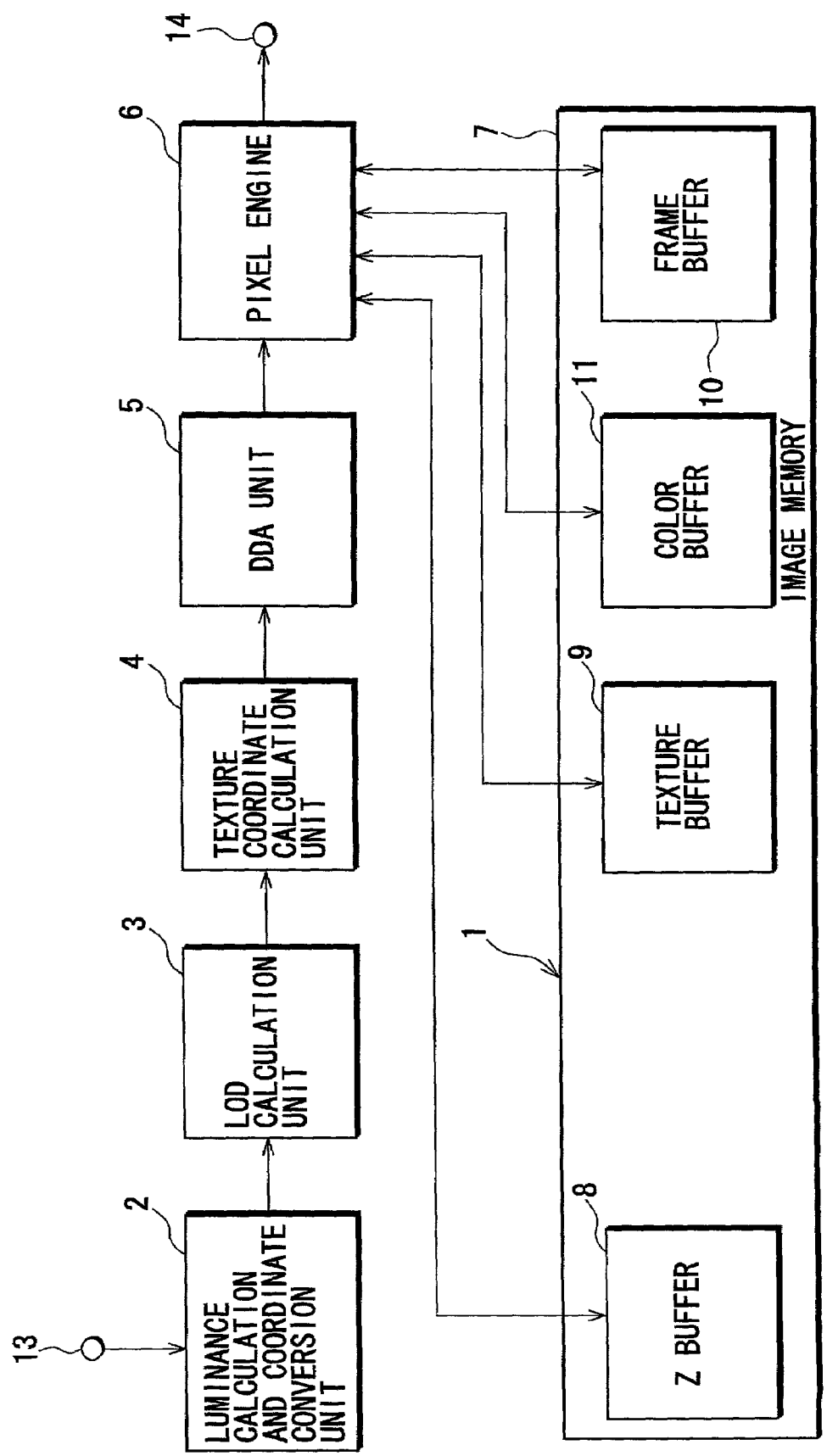
FIG. 1 is a block diagram explaining a principal portion of an image processing device according to an embodiment of the present invention.

FIG. 1 shows a schematic configuration of a principal portion of an image processing device 1 according to the embodiment of the present invention. The image processing device 1 of the embodiment is a device for generating a two-dimensional image based on texture mapping onto three-dimensional polygons, and is applicable to television game machines, personal computers and three-dimensional graphic devices (in particular, to so-called graphic synthesizers).

The image processing device 1 shown in FIG. 1 mainly comprises a luminance calculation and coordinate conversion unit 2, an LOD (Level Of Detail) calculation unit 3, a texture coordinate calculation unit 4, a DDA (Digital Differential Analyzer) unit 5, a pixel engine 6 and an image memory 7.

The image memory 7 further comprises various storage areas such as a Z buffer 8 for storing values in the depth-wise direction from a viewpoint (Z coordinate values), a texture buffer 9 for storing data such as texture for generating overall colors and patterns on the polygons by mapping and a CLUT (Color Look Up Table), a frame buffer 10 for storing and synthesizing frame data (two-dimensional image data) displayed on a two-dimensional monitor screen, and a color buffer 11 for storing three primary color data of red (R), green (G) and blue (B) in the image obtained after being drawn into such frame buffer 10.

Typically input through an input terminal 13 of the image processing device 1 provided with such components are three-dimensional polygon information, texture information, light source information and viewpoint information for drawing a three-dimensional image. This various information typically is supplied through a communication line or a storage device.

The three-dimensional polygon information typically includes information such as (x, y, z) coordinates of the individual apexes of the triangular polygons and normal lines at such apexes; and the viewpoint information and light source information are used for luminance calculation and coordinate conversion for the polygons. The light source information may express not only a single light source but also a plurality of light sources.

The texture information typically includes texture coordinate information corresponding to the individual apexes of the triangular polygons and the CLUT used for drawing color or patterns.

The CLUT comprises a three-primary-color table containing values for R (red), G (green) and B (blue), and an α value table. The three-primary-color table is used for defining colors of each pixel of a texture. The α value is a coefficient value for defining a ratio of image blending (α blending) in texture mapping for each pixel, which is, in other words, a coefficient value for expressing semi-transparency. In the present embodiment, the α values in the CLUT are gradated in a plurality of steps, details of which will be described later. That is, in the present embodiment, relationships between the table numbers and α values are such that a larger table number is related to a smaller (or larger) α value. The present embodiment typically shows a case in which a larger table number is related to a smaller α value.

Indices for retrieving values for R, G and B from the CLUT (or values for designating the table numbers of the CLUT) are set for each pixel expressed by X-Y coordinate values of the texture. In the present embodiment, the indices used for retrieving α values from the CLUT are byte values of the individual pixels, for example, in the G (green)-plane stored in the color buffer 11. In the present embodiment, the byte values of the individual pixels in the G-plane are set so that the pixels having higher G levels will have larger values.

Such information is first entered into the luminance calculation and coordinate conversion unit 2 of the image processing device 1.

The luminance calculation and coordinate conversion unit 2 converts the input individual coordinate information of the polygons into coordinate values in a coordinate system for the two-dimensional drawing, and calculates the luminance at the individual apexes of the polygons based on the viewpoint information and the light source information. In addition to the foregoing calculations, the luminance calculation and coordinate conversion unit 2 is also responsible for other processing, such as transparent conversion. The individual values calculated in the luminance calculation and coordinate conversion unit 2 are input to the LOD calculation unit 3.

The LOD calculation unit 3 calculates, based on Z coordinate values of such converted polygons, LOD (Level Of Detail) values which are used when the pixel engine 6 reads out basic textures from the texture buffer 9. Here, the LOD value can be calculated from a shrinkage factor when a polygon is shrunk, where such shrinkage factor is typically obtained as a logarithmic value of the distance from the viewpoint to the polygon. The LOD value is sent via the texture coordinate calculation unit 4 and the DDA unit 5 to the pixel engine 6.

The texture coordinate calculation unit 4 calculates texture coordinate values which are used when the pixel engine 6 reads out texture coordinates from the texture buffer 9. These texture coordinate values are sent via the DDA unit 5 to the pixel engine 6.

The DDA unit 5 converts the two-dimensional polygon apex information, Z coordinate values, luminance information and so forth into pixel information. More specifically, the DDA unit 5 serially determines, by linear interpolation, the coordinate values, Z values, luminance values and texture coordinate values for the individual pixels. Output of such DDA unit 5 is sent to the pixel engine 6.

The pixel engine 6 not only controls read-out and write-in operations to or from the Z buffer 8, the texture buffer 9, the frame buffer 10 and the color buffer 11, but is also responsible for texture mapping, comparison of the Z coordinate values, and calculation of the pixel values.

The pixel engine 6 is also responsible for processing to extract a high luminance edge of the image, processing to retrieve R, G and B data from the CLUT corresponding to the texture indices to thereby set colors for the individual pixels, and α blending using α values (gradated α values) retrieved from the CLUT using as an index byte values for the individual pixels in the G-plane, the details of operational flow and process flow of which will be described later.

The pixel engine 6 is also responsible for scissoring, dithering, color clamping and so forth. Scissoring refers to a process for removing data which overflows the screen. Dithering refers to a process for staggering color pixel arrangement so as to express a large number of apparent colors with a small number of color pixels. Color clamping refers to a process for limiting calculated color values so as to not exceed 255 or become lower than 0.

Image data obtained by the foregoing processes which take place in the pixel engine 6 are then stored in the frame buffer 10, where frame data to be displayed on a two-dimensional monitor screen (two-dimensional image data) are generated. Such generated two-dimensional image data are then read out from the frame buffer 10, output through an output terminal 14 and sent to a two-dimensional monitor device.

Image Processing of Present Embodiment

The following paragraphs describe detail of the CLUT according to the present embodiment, and a process flow for setting color of the texture using such CLUT and anti-aliasing (jaggedness reduction processing) depending on the luminance of the edge portion of the image based on a blending, in comparison with color or pattern setting of the texture or a blending using a general CLUT.

Typical Image Processing Using General CLUT

The relationship between the texture index and three principal color data for R, G and B and α value in a general CLUT will be explained with reference to FIGS. 2 and 3. FIG. 2 shows a typical example of a general CLUT, and FIG. 3 shows an X-Y coordinate of individual pixels composing the texture (enlarged portion of the texture) and an example of indices for defining the color or pattern of such individual pixels.

The CLUT shown in FIG. 2 comprises table numbers (No.), color data for R, G and B, and α values (values listed in column "A"). The table numbers, color data for R, G and B, and α values shown in FIG. 2, and the indices of the individual pixels shown in FIG. 3 are respectively expressed in hexadecimal numbers. The table numbers are specified by the index of the individual pixels; values of the color data for R, G and B indicate levels of the three principal colors; and α values indicate the degree of semi-transparency.

Figure 3:
FIG. 3 is a chart for explaining indices used for determining R, G and B component data from the CLUT.

Referring now to FIGS. 2 and 3, index "00" in FIG. 3 corresponds to table No. "00" in FIG. 2, where the same will apply thereafter in which index "01" corresponds to table No. "01"; index "02" to table No. "02"; index "03" to table No. "03" and so on.

All pixels having an index of "00" in FIG. 3 are assigned with data "ff" for R, "00" for G and "00" for B, which are represented by table No. "00" in FIG. 2. That is, all pixels having an index of "00" are assigned with pure red. Similarly, all pixels having an index of "01" in FIG. 3 are assigned with data "ff" for R, "ff" for G and "ff" for B, which are represented by table No. "01" in FIG. 2. That is, all pixels having an index of "01" are assigned with white, which is attained by mixing the individual colors of R, G and B in a maximum and equivalent level. Again similarly, all pixels having an index of "02" in FIG. 3 are assigned with data "40" for R, "80" for G and "40" for B, which are represented by table No. "02" in FIG. 2. That is, all pixels having an index of "02" are assigned with dark green, which is attained by mixing three primary colors where only G has a higher level than those of R and B. Again similarly, all pixels having an index of "03" in FIG. 3 are assigned with data "00" for R, "00" for G and "ff" for B, which are represented by table No. "03" in FIG. 2. That is, all pixels having an index of "03" are assigned with pure blue.

Figure 4:
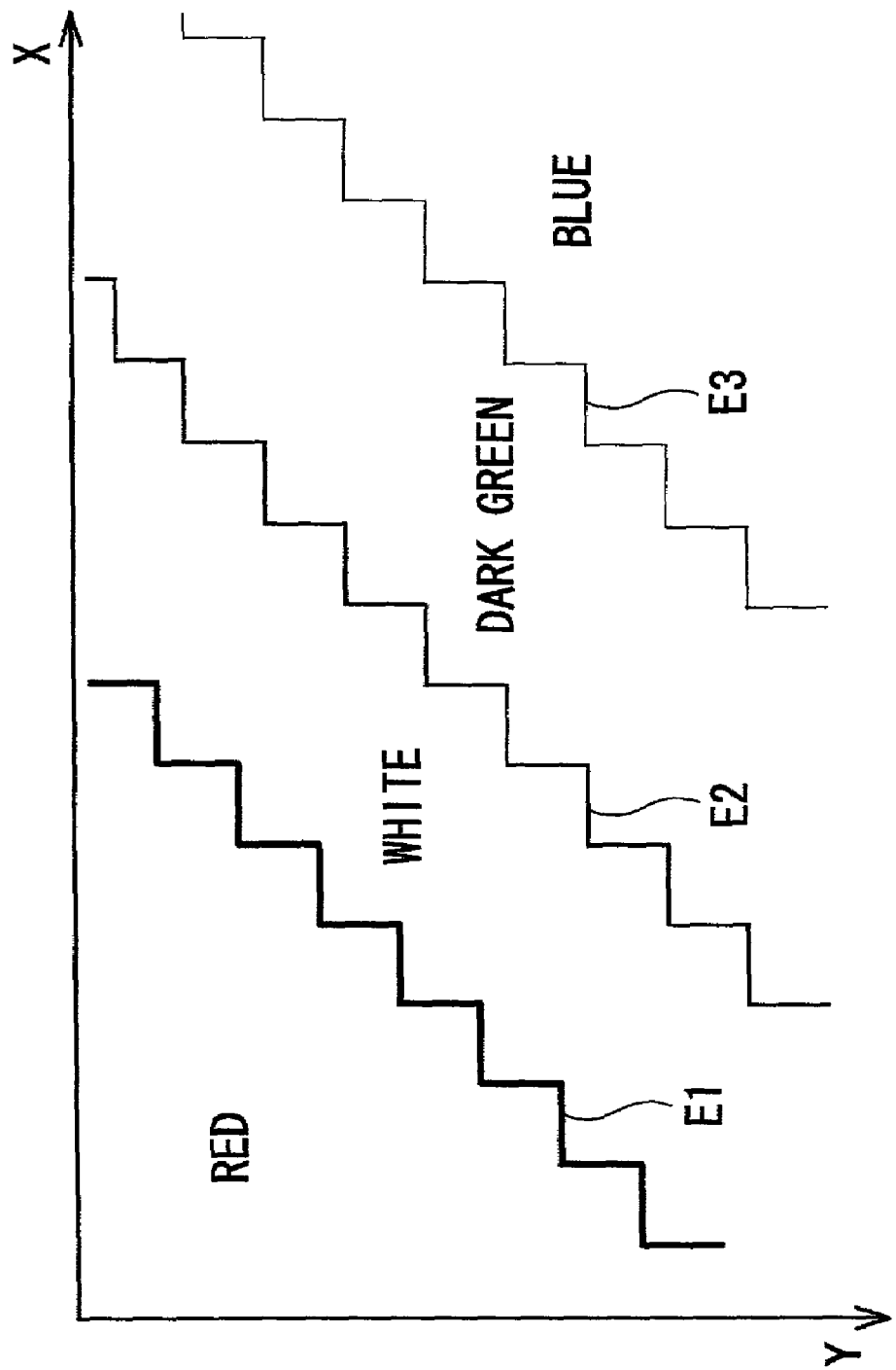
FIG. 4 is a chart for explaining an image with jaggedness which was drawn by coloring based on the indices shown in FIG. 3 and on the general CLUT.

An image drawn based on the CLUT shown in FIG. 2 and indices shown in FIG. 3 is one having a texture in which color zones of "red", "white", "dark green" and "blue" appear in this order from the upper left corner towards the lower right corner, as shown in FIG. 4. Now, as is clear from FIG. 4, a boundary (edge E1) between the "red" zone and "white" zone, a boundary (edge E2) between the "white" zone and "dark green" zone, and a boundary (edge E3) between the "dark green" zone and "blue" zone will be generated with step-like unsmoothness (jaggedness) representing the pixel profile. Of the individual edges E1, E2 and E3, edge E1 has the highest luminance (brightest), which is followed by edge E2 and edge E3 in this order.

According to the CLUT shown in FIG. 2, the individual pixels having indices of "00" to "03" in FIG. 3 are assigned with an α value of "80" which corresponds to table Nos. "00" to "03" in FIG. 2. Such α value of "80" represents a degree of semi-transparency of approx. 0.5 (i.e., 50%), so that the example shown in FIGS. 2 and 3 yields an image in which the colors shown in FIG. 4 are drawn so as to overlap an already-drawn image in a 50% transparency.

As is clear from the above, only the colors or patterns of the texture and the ratio of image blending in the a blending can be defined by using the general CLUT and indices shown in FIGS. 2 and 3. Another disadvantage resides in that the boundary areas (edges E1 to E3) between the adjacent color zones will have a jagged pixel profile, where the jaggedness generated on the boundary with the "white" zone (edges E1 and E2), which is particularly high in luminance, is quite outstanding.

Outline of Anti-Aliasing Using CLUT of Present Embodiment

While the foregoing FIGS. 2 and 3 show a general CLUT and an exemplary use thereof, the present embodiment will employ a CLUT in which the α values are gradated as shown in FIG. 5, and will use, as an index for defining such α values in the CLUT, predetermined byte data of an image after being drawn in the frame buffer 10, where the defined α values obtained from the CLUT as being indexed by the predetermined byte data are used for α blending of the current image with a blurred image thereof, to thereby achieve anti-aliasing depending on the luminance of the edge of the image.

More specifically, in the present embodiment, α values in the CLUT are gradated so that larger α values will have higher semi-transparency (lower transparency). At the same time, the G-plane, which can most strongly affect the luminance out of three primary colors of R, G and B, is subjected to Laplacean filtering; byte values of the individual pixels on the G-plane after such Laplacean filtering are used as indices for defining a values in the CLUT; and an a plane obtained by such indexing is used for a blending of the current image and a blurred image thereof to thereby ensure anti-aliasing depending on the luminance of the edge of the image. This allows the jaggedness to be reduced at the edge portion where flicker is particularly distinctive. While the Laplacean filtering can be applied to either the R-plane, B-plane, all planes or arbitrary combinations thereof, it is most advantageously applied to the G-plane, which can most strongly affect the luminance out of three primary colors of R, G and B, from the viewpoint of reducing the jaggedness at the edge portion where the luminance is particularly high.

Specific Process Flow of Edge Anti-Aliasing of Present Embodiment

The following paragraphs describe an exemplary process flow, in which byte values of the individual pixels in the G-plane after the Laplacean filtering are used as indices for specifying the α values in the CLUT shown in FIG. 5 to thereby ensure anti-aliasing depending on the luminance of the edge portion of the image.

Figure 6:
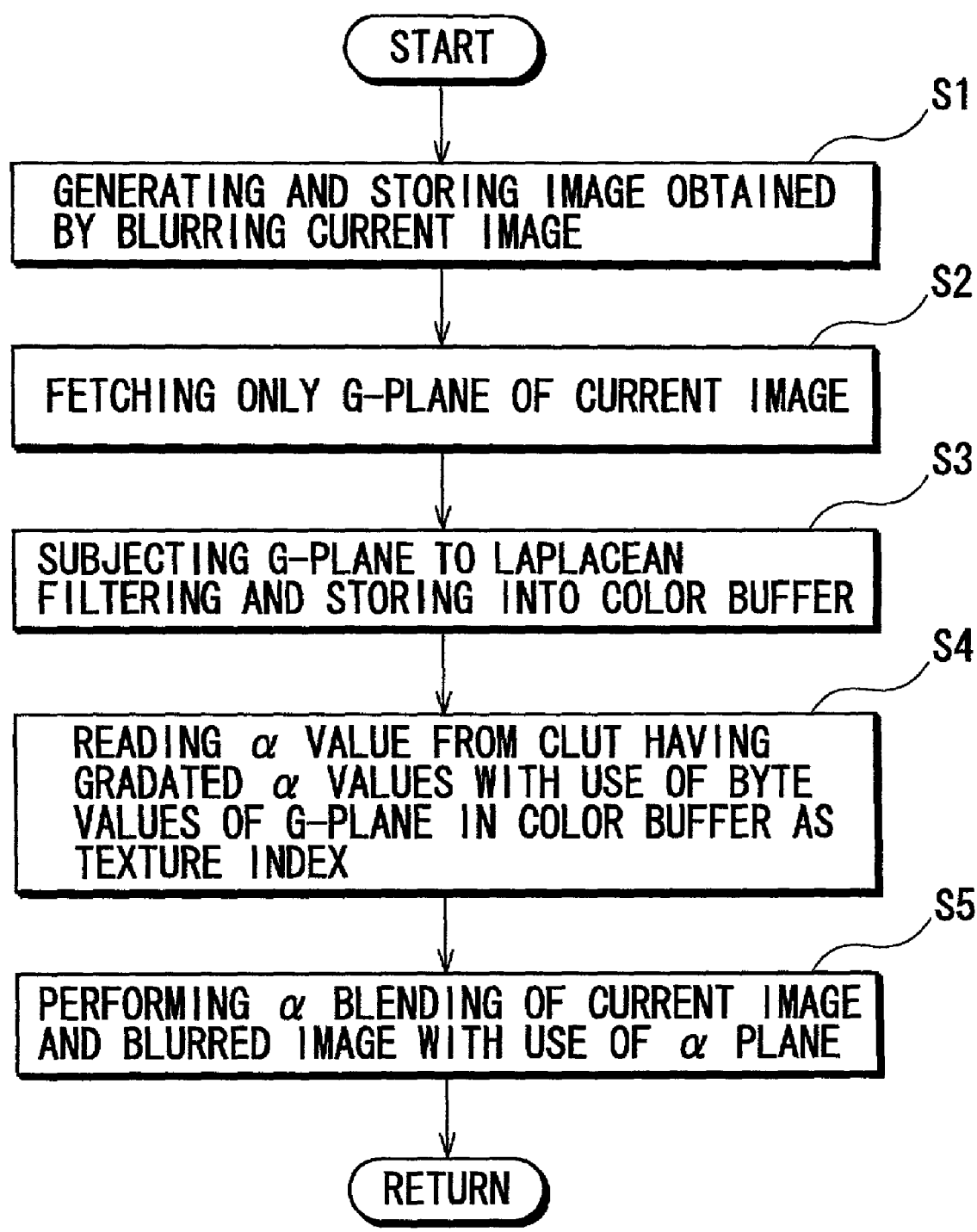
FIG. 6 is a flow chart showing a schematic flow of anti-aliasing depending on the difference in luminance at the edge portion according to the present embodiment.

FIG. 6 shows schematically the flow of the anti-aliasing process of the present embodiment. The processing described below is executed mainly by the pixel engine 6 using data stored in the image memory 7.

As shown in FIG. 6, first in step S1 the pixel engine 6 draws a current image (a first image in the present invention) into the frame buffer 10, and writes a Z value into the Z buffer 8. The pixel engine 6 separately produces an image (a second image in the present invention) by uniformly blurring the current image, and stores such blurred image into another area within the frame buffer 10. It is also possible to provide a separate frame buffer besides the frame buffer 10, and to store the blurred image into such separate frame buffer. There are various techniques for generating the blurred image, one of which, for example, relates to synthesis of the current image while being slightly dislocated.

Figure 7:
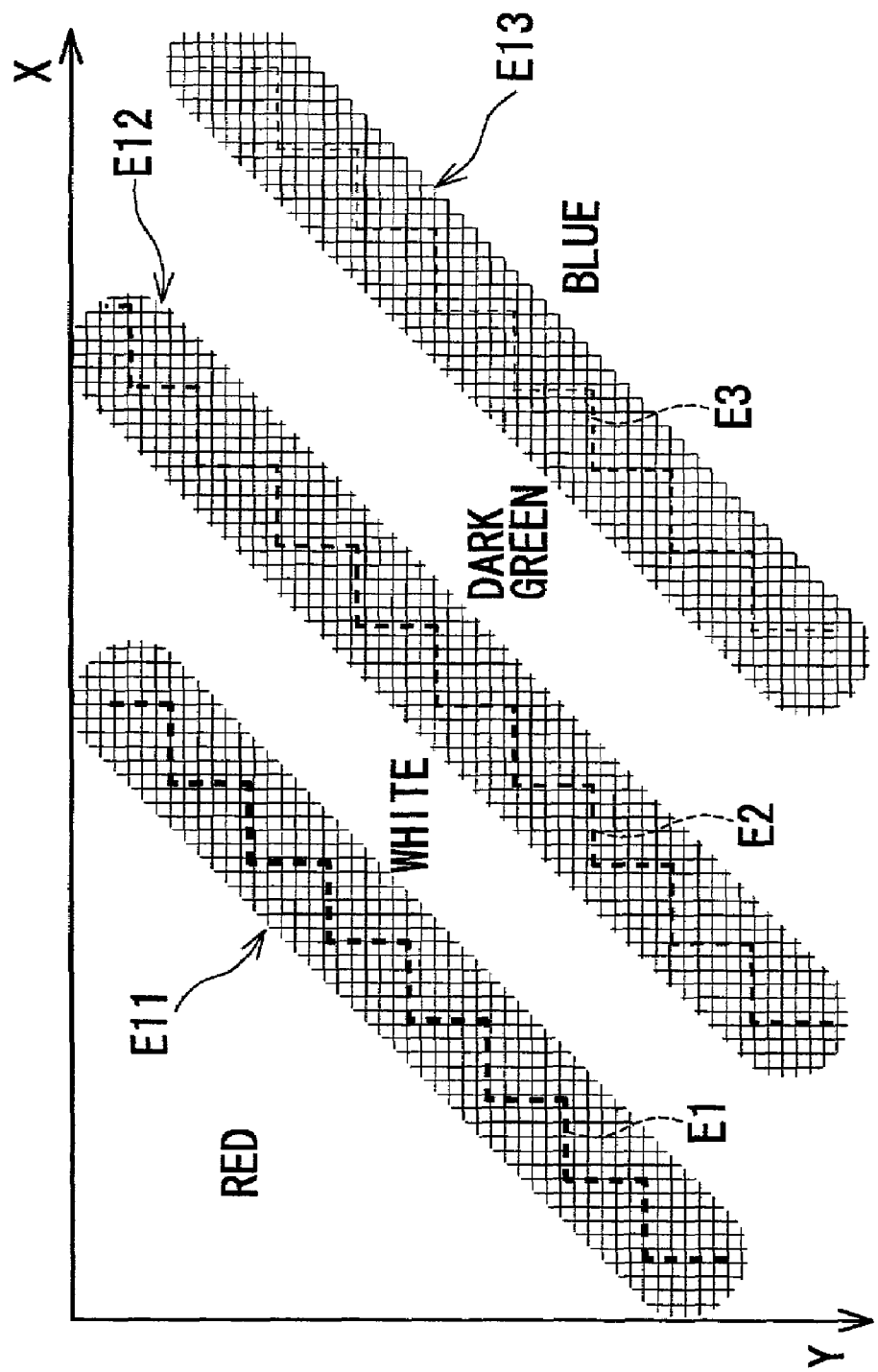
FIG. 7 is a chart showing an exemplary blurred image obtained by blurring the entire portion of the current image.

For the case in which the current image has color zones of "red", "white", "dark green" and "blue" appearing in this order from the upper left corner towards the lower right corner as shown in FIG. 4, the blurred image thereof will be as shown in FIG. 7, in which image areas E11 to E13 on the boundaries between the adjacent color zones have ambiguous and mixed tones. The broken lines in FIG. 7 represent the edges E1 to E3 of the individual color zones, and the hatching in the individual image areas E11 to E13 represent a state in which such edges E1 to E3 are blurred. In such blurred image shown in FIG. 7, the image areas E11 to E13 are hardly recognized (invisible) as having step-like profiles like the edges E1 to E3 in FIG. 4, since images are mixed in the image areas E11 to E13.

Next in step S2, the pixel engine 6 retrieves the G-plane from an image whose colors are defined by the CLUT in FIG. 5 using the indices for the individual pixels shown in FIG. 3. The plane solely composed of green color thus retrieved during the process in step S2 is as shown in FIG. 8, where the individual pixel levels are expressed by hexadecimal byte values.

More specifically, according to the example shown in FIGS. 3 and 5, the indices for the individual pixels in FIG. 3 correspond with the table numbers in FIG. 5. Therefore, for the plane solely composed of green color, all pixels having an index of "00" in FIG. 3 are assigned only with byte value "00" for G out of byte values for R, G and B specified by table No. "00" in FIG. 5; and all pixels having an index of "01" in FIG. 3 are assigned only with byte value "ff" for G out of byte values for R, G and B specified by table No. "01" in FIG. 5. The same will apply thereafter, in which all pixels having an index of "02" in FIG. 3 are assigned only with byte value "80" for G out of the individual byte values specified by table No. "02" in FIG. 5; and all pixels having an index of "03" in FIG. 3 are assigned only with byte value "00" for G out of the individual byte values specified by table No. "03" in FIG. 5. Thus, the G-plane will have the levels of the individual pixels as expressed by the byte values shown in FIG. 8. More specifically, in the plane shown in FIG. 8, the pixels having a level of "00" are shown in black, those having a level of "ff" in "light green" and those having a level of "80" in dark green.

Figure 8:
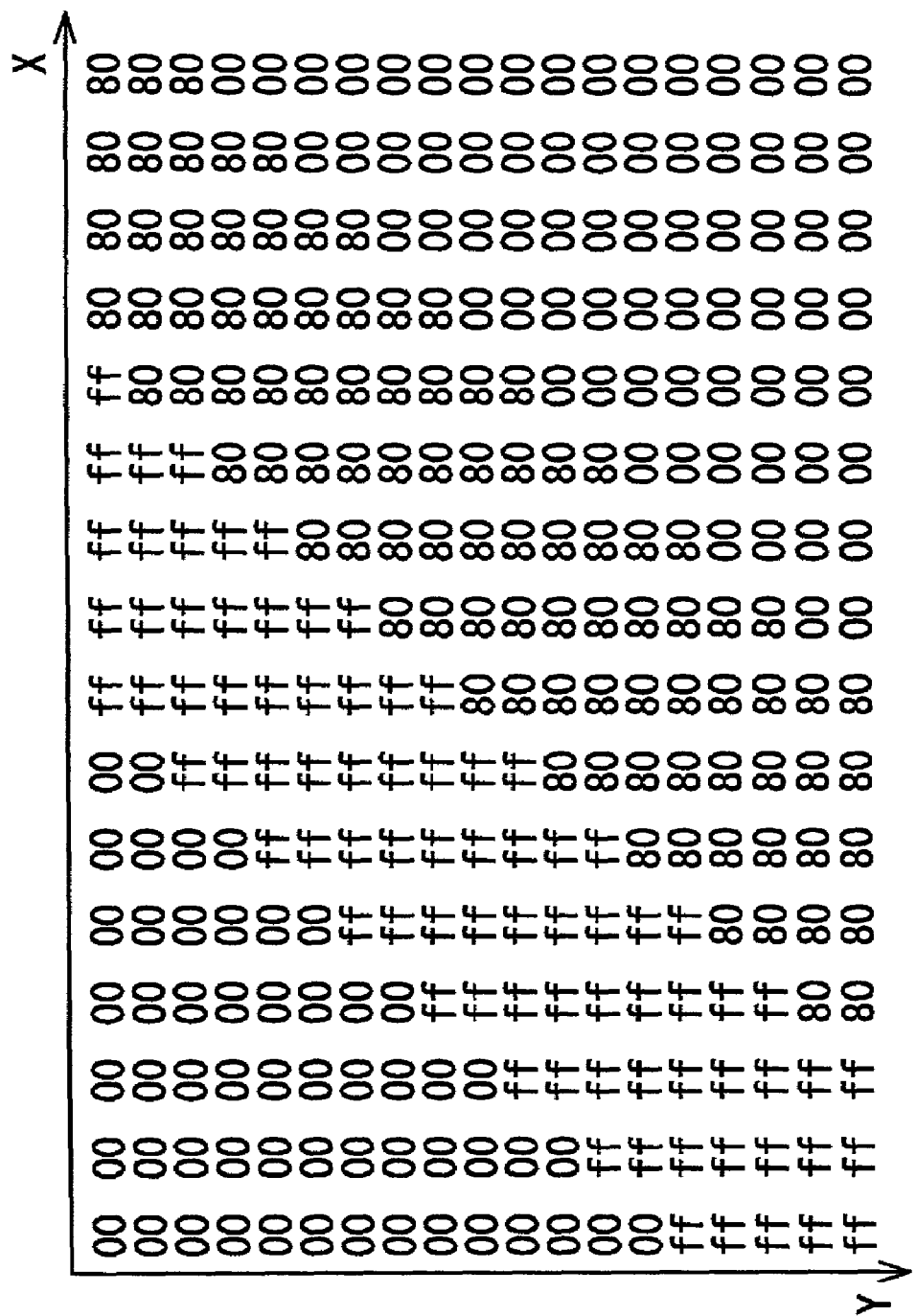
FIG. 8 is a chart for explaining the G-plane only.
Figure 9:
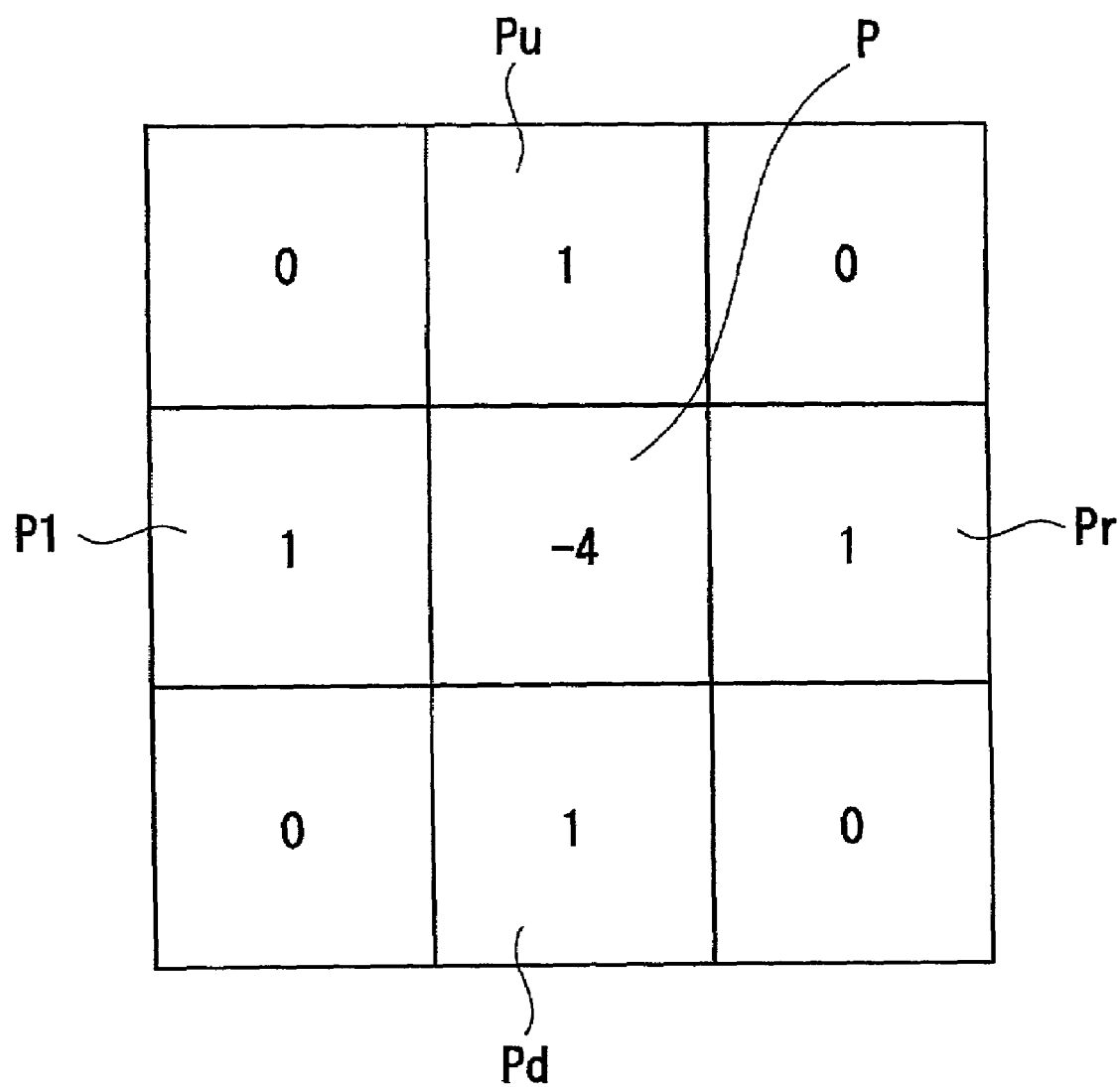
FIG. 9 is a chart for explaining 4-neighbored Laplacean filtering.

Next in step S3, the pixel engine 6 submits the G-plane comprising hexadecimal values, as shown in FIG. 8, to 4-neighbored Laplacean filtering, as shown in FIG. 9, and stores the processed G-plane into the color buffer The 4-neighbored Laplacean filtering is a process in which, as shown in FIG. 9, a value of a target pixel P multiplied by a coefficient (−4) is compared with a sum of values of upper, lower, left and right adjacent pixels Pu, Pd, Pl and Pr around such target pixel P individually multiplied by a coefficient (+1), and a difference calculated from the comparison is given as a value for such target pixel P. That is, the Laplacean filtering is a calculation for obtaining the difference in luminance between a target pixel and the adjacent pixels thereof, and can extract only portions, such as the edge portion, where a difference in luminance occurs between the adjacent pixels. In a practical process of the Laplacean filtering, the image processing device switches the operational mode of the individual pixel data in the α blending between an addition mode and subtraction mode to thereby perform addition and subtraction while stepwisely advancing over the pixels in synchronization with the calculation of the Laplacean filtering shown in FIG. 9. Although the present embodiment deals with 4-neighbored Laplacean filtering, it is also possible to adopt 8-neighbored Laplacean filtering which involves 8 pixels located on the upper, lower, left, right, upper right, lower right, upper left and lower left positions around a target pixel. The 8-neighbored Laplacean filtering can provide a more precise difference in the luminance than the 4-neighbored Laplacean filtering can.

Figure 10:
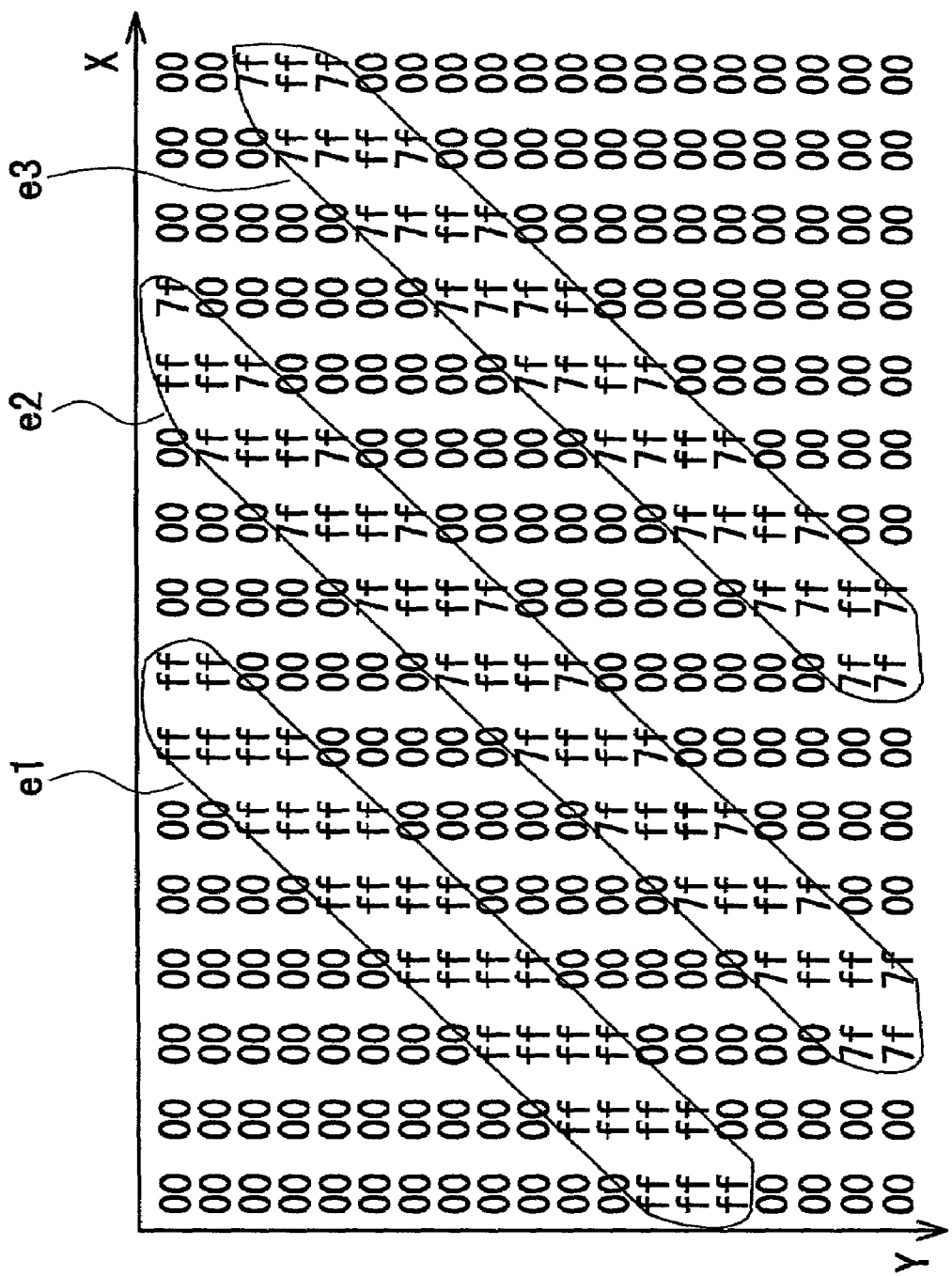
FIG. 10 is a chart for explaining the G-plane after being subjected to 4-neighbored Laplacean filtering.

Processing of the individual hexadecimal pixel values composing the G-plane shown in FIG. 8 by 4-neighbored Laplacean filtering and, for example, clamping the resultant values expressing the luminance of the individual pixels will provide the hexadecimal values shown in FIG. 10. As is obvious from FIG. 10, Laplacean filtering of the G-plane shown in FIG. 8 results in a plane having values "00" for the entire area other than areas e1 to e3 which individually correspond to the edges E1 to E3, and such areas e1 to e3 have values corresponding to the difference in luminance at such individual edges E1 to E3. More specifically, the individual pixels in area e1 corresponding to the edge E1 in FIG. 4, having a large difference in luminance, will have generally large byte values; those in area e2 corresponding to the edge E2 having the second largest difference in luminance will have the second largest byte values; and those in area e3 corresponding to the edge E3 having a smaller difference in luminance than in areas e1 and e2 will have generally smaller byte values than in areas e1 and e2.

Next in step S4, the pixel engine 6 retrieves α values from the CLUT shown in FIG. 5 in which the α values are gradated, using as indices the byte values of the individual pixels in the G-plane (G-plane after the Laplacean filtering) stored in the color buffer 11.

Figure 11:
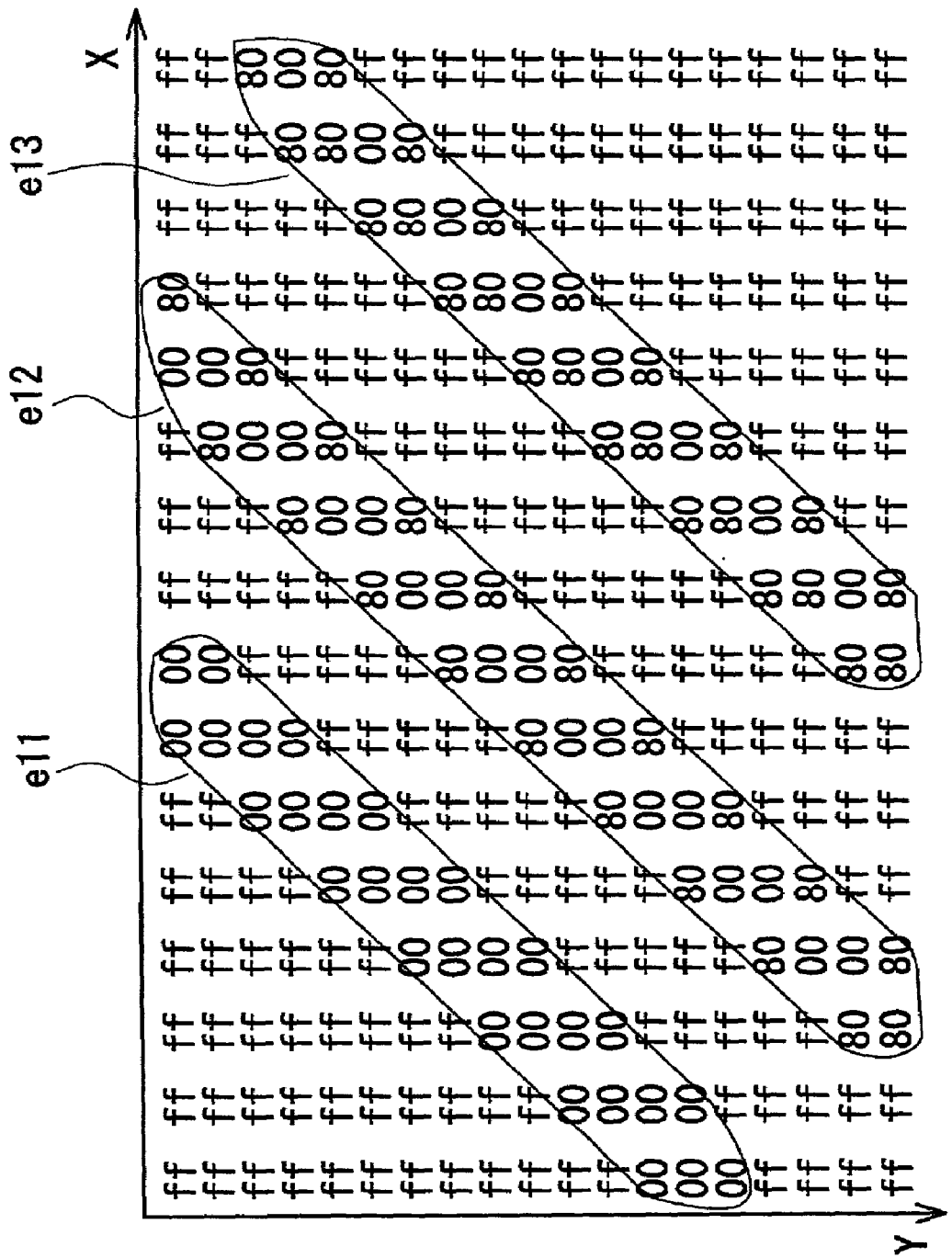
FIG. 11 is a chart for explaining the α plane obtained from the CLUT shown in FIG. 5 using as an index a value of the G-plane after being processed by 4-neighbored Laplacean filtering.

When the α values are retrieved from the CLUT shown in FIG. 5 using as indices the byte values of the individual pixels in the G-plane shown in FIG. 10 after being processed by Laplacean filtering, the resultant individual values of the a plane will have the values shown in FIG. 11. As is clear from FIG. 11, retrieving the α values using as indices the byte values of the individual pixels in the G-plane after being processed by Laplacean filtering results in the α plane having values "ff" for the entire area other than areas e11 to e13 which individually correspond to the edges E1 to E3, and such areas e11 to e13 have values corresponding to the difference in luminance at such individual edges E1 to E3. More specifically, the individual pixels in area e11 corresponding to the edge E1 in FIG. 4, having a large difference in luminance, will generally have a value expressing a high opacity; those in area e12 corresponding to the edge E2 having the second largest difference in luminance will have a value expressing the second highest opacity next to the area e11; and those in area e13 corresponding to the edge E3 having a smaller difference in luminance than in areas e11 and e12 generally will have a smaller opacity than in areas e11 and e12.

Next in step S5, the pixel engine 6 blends the current image shown in FIG. 4 and the blurred image shown in FIG. 7 produced in the foregoing step S1, both images having been stored in the frame buffer 10, using the α plane comprising the α values read out in the process of step S4.

Figure 12:
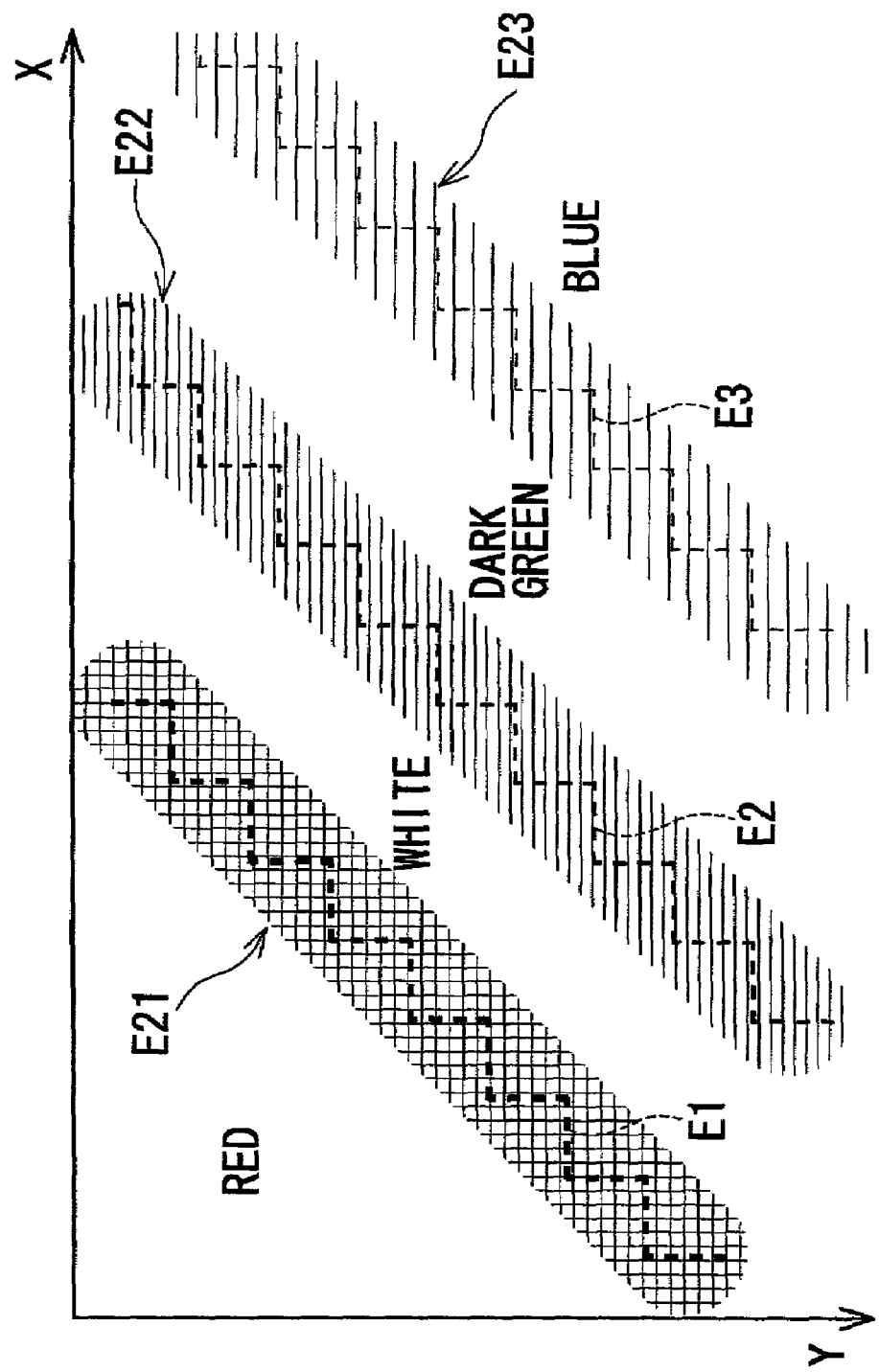
FIG. 12 is a chart for explaining an image obtained after being processed by anti-aliasing depending on the difference in luminance at the edge portion.

In such step S5, α blending of the present image shown in FIG. 4 and the blurred image shown in FIG. 7 using the α plane shown in FIG. 11 will result in an image shown in FIG. 12. Since the α plane shown in FIG. 11 has α values in areas e11 to e13 corresponding to the difference in luminance in edges E1 to E3 shown in FIG. 4, an image area E21 corresponding to edge E1 having a large difference in luminance will have a large ratio of blending such blurred image, an image area E22 corresponding to edge E2 having a smaller difference in luminance than edge E1 will have a smaller ratio of blending such blurred image, and an image area E23 corresponding to edge E3 having a still smaller difference in luminance than edge E2 will have a still smaller ratio of blending such blurred image.

As has been described in the above, through α blending of the image shown in FIG. 4 with the blurred image shown in FIG. 7 depending on the difference in luminance at the individual edges E1 to E3, the present embodiment ensures anti-aliasing depending on differences in luminance at the edge portions.

In the pixel engine 6, the processes of the flow chart shown in FIG. 6 can also be accomplished on a hardware basis such as using a DSP, or on a software basis using a processing program downloaded through a communication network or using an image processing program read out by a storage device from a storage medium, which are executed by a CPU. In particular, when the processing in the pixel engine 6 is accomplished on a software basis, the image processing program will be such as to serially execute the individual process steps previously explained referring to the flow chart of FIG. 6. Such image processing program may not only be provided previously as a processing program dedicated to the pixel engine 6, but also may be input together with, or prior to, the polygon information through the input terminal 13. The blurred image generation in step S1 in FIG. 6 may be executed at any stage before the processing in step S5.

Figure 13:
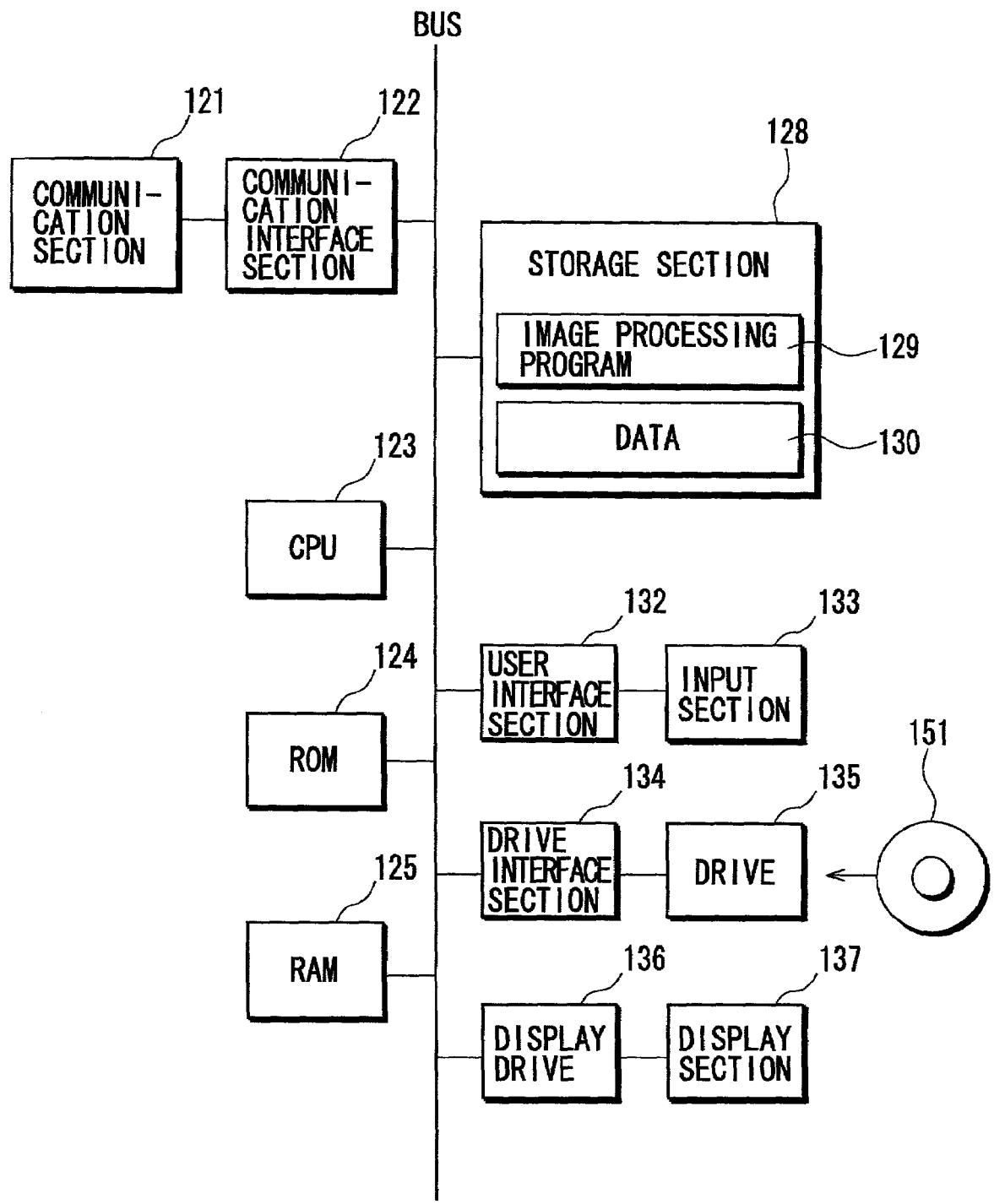
FIG. 13 is a block diagram showing a schematic configuration of a personal computer for executing an image processing program, a flow chart of which is shown in FIG. 6.

As one example for accomplishing the image processing of the present embodiment on a software basis, FIG. 13 shows a schematic configuration of a personal computer for executing the image processing program having the flow shown in FIG. 6. The image processing program of the embodiment is mainly executed by a CPU 123 shown in FIG. 13.

In FIG. 13, a storage section 128 typically comprises a hard disk and a drive therefor. Such hard disk has stored therein an operating system program, an image processing program 129 of the embodiment read out from one of various recoding media such as a CD-ROM or DVD-ROM, or downloaded through a communication line, and a variety of data 130 such as graphic information for polygon drawing, textures, Z values, general textures, color values and α values.

Communication section 121 refers to a communication device responsible for data communication with external devices, which may be a modem for establishing connection to an analog public telephone line, a cable modem for establishing connection to a cable television network, a terminal adaptor for establishing connection to an ISDN (integrated services digital network), or a modem for establishing connection to an ADSL (asymmetric digital subscriber line). Communication interface section 122 refers to an interface device responsible for protocol transform for enabling transmission/receipt of data between the communication section 121 and an internal bus (BUS).

Input section 133 refers to an input device, such as a keyboard, mouse or touch pad, and user interface section 132 refers to an interface device for supplying signals from such input section 133 to the internal devices.

Drive 135 refers to a drive device capable of reading out various data or programs including the image processing program of the embodiment from a recording medium, including a disk medium 151, such as a CD-ROM or DVD-ROM, or from a card-type or other type of semiconductor memory. Drive interface section 134 refers to an interface device for supplying signals from the drive 135 to the internal devices.

Display section 137 refers to a display device, such as a CRT (cathode ray tube) or liquid crystal display, and display drive 136 is a drive device for driving the display section 137.

The ROM 124 typically comprises a rewritable non-volatile memory such as a flash memory, which stores a BIOS (Basic Input/Output System) and various default values. The RAM 125 will have loaded therein application programs and various data read out from a hard disk of the storage section 128, and is used as a work RAM of the CPU 123.

The CPU 123 controls the entire operation of the personal computer and executes the foregoing image processing based on the operating system program stored in the storage section 128 or the image processing program 129 of the present embodiment. That is, as shown in FIG. 13, the CPU 123 can accomplish the image processing as described in the above embodiment by executing the image processing program 129 of the embodiment, which is one of the application programs read out from the hard disk of the storage section 128 and loaded into the RAM 125.

As has been described in the above, the present embodiment employs a CLUT in which the α values are gradated. At the same time, the G-plane which can most strongly affect the luminance is subjected to Laplacean filtering; byte values of the individual pixels on the G-plane after such Laplacean filtering are used as indices to thereby obtain the α plane; and the obtained α plane is used for α blending of the current image and a blurred image thereof. This ensures anti-aliasing depending on the difference in luminance at the edge portion of the image and allows the jaggedness to be reduced at the edge portion where flicker is particularly distinctive, to thereby successfully obtain a high quality image free from flicker.

In the present embodiment, the foregoing processes can be executed on a DMA packet basis, which beneficially reduces the processing load on a CPU, for example, in a video game machine, personal computer or three-dimensional graphic device, and thus allows such processes to be executed only by the image processing function of a graphic synthesizer. In the present embodiment, the foregoing function is attainable by only a simple Laplacean filtering and α blending of an image drawn into the frame buffer 10, and does not require the high-speed ray tracing calculation or high-resolution image production used in conventional image processing devices, does not require a high-performance CPU, and successfully avoids increased costs. Since the α values are gradated in 256 steps (1 byte equivalent) in the present embodiment, the anti-aliasing of the edge portion can be accomplished in a substantially continuous number of steps.

The embodiment described in the above is only one example of the present invention. It is therefore to be understood that the present invention may be practiced in any modifications depending on the design or the like other than as specifically described herein without departing from the scope and the technical spirit thereof.

For example, while the present embodiment dealt with a case in which anti-aliasing is effected depending on the luminance at the edge of an image, the present invention is by no means limited to such anti-aliasing, but is also applicable to various other processes such as image processing using arbitrary byte data on the frame buffer as an index for a texture, or α blending using such arbitrary byte data as an index for specifying the α values.

While the present embodiment was described in connection with color images, the present invention is also applicable to monochrome images. The present invention is also applicable not only to images produced by computer graphics, but also to those output, for example, from a image pickup device having arranged therein a matrix of image pickup elements. While the present embodiment dealt with a case in which anti-aliasing was applied to the edge of the image by α blending of a blurred image, it is also possible to obtain special graphic effects by using an arbitrary patterned image in place of such blurred image, and by α blending such arbitrary patterned image with the current image.

What is claimed is:

1. An image processing method, comprising:
retrieving a predetermined data section from data defining a first image, the predetermined data section expresses an edge of the first image and is extracted using Laplacean filtering;
retrieving a coefficient value from a predetermined table using a value of the predetermined data section as an index;
generating a second image by blurring the first image; and
synthesizing the first image with the second image depending on the coefficient value.

2. The image processing method according to claim 1, wherein the predetermined table has a plurality of coefficient values which are gradated.

3. The image processing method according to claim 1, further comprising determining as the coefficient value a semi-transparent coefficient which defines a larger synthetic ratio of the second image as the value of the predetermined data section increases.

4. The image processing method according to claim 1, wherein the predetermined data section is one which expresses an edge of the first image.

5. The image processing method according to claim 1, wherein the predetermined data section is one which largely affects the luminance of the first image.

6. The image processing method according to claim 5, further comprising:
extracting a data section which expresses an edge of the first image from the predetermined data section; and
retrieving the coefficient value from the predetermined table using a value of the extracted data section as the index.

7. The image processing method according to claim 5, wherein when the data defining the first image includes red component data, green component data and blue component data, the predetermined data section is the green component data.

8. An image processing device, comprising:
a data retrieving unit operable to retrieve a predetermined data section from data defining a first image, the predetermined data section including data which expresses an edge of the first image and the data retrieving unit extracting the predetermined data section using Laplacean filtering;
a coefficient retrieving unit operable to retrieve a coefficient value from a predetermined table using a value of the predetermined data section as an index;
a first image processor operable to blur the first image to thereby generate a second image; and
a second image processor operable to synthesize the first image with the second image depending on the coefficient value.

9. The image processing device according to claim 8, wherein the predetermined table has a plurality of coefficient values which are gradated, and the coefficient retrieving unit retrieves the coefficient value using a value of the predetermined data section as the index.

10. The image processing device according to claim 8, wherein the coefficient retrieving unit determines as the coefficient value a semi-transparent coefficient which defines a larger synthetic ratio of the second image as the value of the predetermined data section increases.

11. The image processing device according to claim 8, wherein the predetermined data section includes a data section which largely affects the luminance of the first image; and the coefficient retrieving unit retrieves the coefficient value from the predetermined table using as the index a value of the data section which largely affects the luminance of the first image.

12. The image processing device according to claim 11, wherein the data retrieving unit extracts data expressing an edge of the first image from the data section which largely affects the luminance of the first image; and the coefficient retrieving unit retrieves the coefficient value from the predetermined table using as the index the extracted data.

13. The image processing method according to claim 11, wherein when the data defining the first image includes red component data, green component data and blue component data, the predetermined data section which largely affects the luminance of the first image is the green component data.

14. A computer-readable recording medium having recorded therein an image processing program to be executed on a computer, the image processing program comprising:
a program portion retrieving a predetermined data section from data defining a first image, the predetermined data section including data expressing an edge of the first image and being extracted using Laplacean faltering;
a program portion retrieving a coefficient value from a predetermined table using a value of the predetermined data section as an index;
a program portion blurring the first image to thereby generate a second image; and
a program portion synthesizing the first image with the second image depending on the coefficient value.

15. The computer-readable recording medium according to claim 14, wherein the predetermined table has a plurality of coefficient values which are gradated.

16. The computer-readable recording medium according to claim 14, wherein the image processing program further comprises a program portion determining as the coefficient value a semi-transparent coefficient which defines a larger synthetic ratio of the second image as the value of the predetermined data section increases.

17. The computer-readable recording medium according to claim 14, wherein the predetermined data section is one which expresses an edge of the first image.

18. The computer-readable recording medium according to claim 14, wherein the predetermined data section is one which largely affects the luminance of the first image.

19. The computer-readable recording medium according to claim 18, wherein when the data defining the first image includes red component data, green component data and blue component data, the predetermined data section is the green component data.

20. A program execution device for executing an image processing program stored in the device, wherein the programmed device performs the following steps:
　retrieving a predetermined data section from data defining a first image, the predetermined data section expressing an edge of the first image and being extracted using Laplacean filtering;
　retrieving a coefficient value from a predetermined table using a value of the predetermined data section as an index;
　blurring the first image to thereby generate a second image; and
　synthesizing the first image with the second image depending on the coefficient value.

21. The program execution device according to claim 20, wherein the predetermined table has a plurality of coefficient values which are gradated.

22. The program execution device according to claim 20, wherein the programmed device further performs the step of determining as the coefficient value a semi-transparent coefficient which defines a larger synthetic ratio of the second image as the value of the predetermined data section increase.

23. The program execution device according to claim 20, wherein the predetermined data section is one which largely affects the luminance of the first image.

24. The program execution device according to claim 23, wherein the following further steps are performed by the programmed device:
　extracting a data section which expresses an edge of the first image from the predetermined data section; and
　retrieving the coefficient value from the predetermined table using a value of the extracted data section as the index.

25. The program execution device according to claim 23, wherein when the data composing the first image includes red, component data, green component data and blue component data, the predetermined data section is the green component data.

26. An image processing program stored in a computer to be executed by the computer, comprising:
　a program portion retrieving a predetermined data section from data defining a first image, the predetermined data section expressing an edge of the first image and being extracted using Laplacean filtering;
　a program portion retrieving a coefficient value from a predetermined table using a value of the predetermined data section as an index;
　a program portion blurring the first image to thereby generate a second image; and
　a program portion synthesizing the first image with the second image depending on the coefficient value.

27. A method for processing an image, comprising:
　maintaining a first data structure including a first field containing a value of a luminance attribute for pixel types included in the image and a second field which is gradated f or successive pixel types;
　producing a second data structure associating the respective luminance attribute values with pixels in the image;
　weighting at least one of the luminance attribute values in the second data structure with the respective value in the gradated field of the first data structure to produce a weighted second data structure; and
　synthesizing the image with a blurred version of the image using the weighted second data structure as a weighting factor for pixels of the image or the blurred image, the resulting synthesized image having reduced edge aliasing compared to the image.

28. The method of claim 27 wherein, prior to the synthesizing step at least one luminance attribute value in the second data structure is filtered to emphasize pixel-to-pixel differences.

29. The method of claim 28 wherein the luminance attribute value is filtered using Laplacean filtering.

* * * * *

UNITED STATES PATENT AND TRADEMARK OFFICE
CERTIFICATE OF CORRECTION

| | | |
|---|---|---|
| PATENT NO. | : 7,167,596 B2 | Page 1 of 1 |
| APPLICATION NO. | : 10/058840 | |
| DATED | : January 23, 2007 | |
| INVENTOR(S) | : Hiroshi Yamamoto | |

It is certified that error appears in the above-identified patent and that said Letters Patent is hereby corrected as shown below:

In Column 12, Line 55, "faltering" should read --filtering--; and

In Column 13, Line 38, "increase" should read --increases--.

Signed and Sealed this

Twentieth Day of November, 2007

JON W. DUDAS
*Director of the United States Patent and Trademark Office*